(12) United States Patent
Vigeant et al.

(10) Patent No.: US 8,172,263 B2
(45) Date of Patent: May 8, 2012

(54) EXTERNALLY ANCHORED UPPER TETHER FOR ALTERING AIRBAG DEPLOYMENT

(75) Inventors: Peter L. Vigeant, Whitmore Lake, MI (US); Robert A. Parks, Berkley, MI (US); David L. Geyer, Sterling Heights, MI (US); Tanja Kryzaniwskyj, Warren, MI (US)

(73) Assignee: Toyoda Gosei Co. Ltd. (JP)

( * ) Notice: Subject to any disclaimer, the term of this patent is extended or adjusted under 35 U.S.C. 154(b) by 177 days.

(21) Appl. No.: 12/267,608

(22) Filed: Nov. 9, 2008

(65) Prior Publication Data

US 2009/0189378 A1 Jul. 30, 2009

Related U.S. Application Data

(63) Continuation-in-part of application No. 12/021,514, filed on Jan. 29, 2008.

(51) Int. Cl.
*B60R 21/16* (2006.01)

(52) U.S. Cl. .................................................. 280/743.2
(58) Field of Classification Search ............... 280/743.2
See application file for complete search history.

(56) References Cited

U.S. PATENT DOCUMENTS 7,152,875 B2 * 12/2006 Kai ................................ 280/739
7,614,657 B2 * 11/2009 Miyata ....................... 280/743.2

FOREIGN PATENT DOCUMENTS

JP 7069149 3/1995

* cited by examiner

*Primary Examiner* — Eric Culbreth
(74) *Attorney, Agent, or Firm* — Carlson Gaskey & Olds P.C.

(57) ABSTRACT

An example airbag arrangement includes an airbag moveable between an expansion-constrained position and an expanded position. The airbag includes a contact face. A tether has a first tether end connected adjacent an upper portion of the contact face and a second tether end anchoring the tether. The tether holds the contact face in a substantially vertical position.

20 Claims, 6 Drawing Sheets

EXTERNALLY ANCHORED UPPER TETHER FOR ALTERING AIRBAG DEPLOYMENT

This invention is a continuation-in-part application to U.S. patent application Ser. No. 12/021,514, filed Jan. 29, 2008.

BACKGROUND

This invention relates to constraining an airbag during deployment using an externally anchored tether.

Known airbag systems protect vehicle occupants by absorbing forces generated during collisions, for example. Many airbag systems are used in conjunction with other vehicle safety systems, such as seat belts. Safety systems protect occupants located in various positions within the vehicle.

In particular, airbag designs within some safety systems protect both "in-position" occupants and "out-of-position" occupants. Typically, during a collision, an "in-position" occupant directly strikes a generally vertical contact face portion of the airbag, whereas an "out-of-position" occupant does not directly strike the contact face. Balancing protection of "in-position" occupants with protection of "out-of-position" occupants is often challenging. Through the contact face, the airbag absorbs forces from the occupant that are generated during the collision. Directly striking the contact face facilitates force absorption.

Generally, it is desirable to provide a substantially planar vertically-oriented contact face when the airbag is fully expanded, as this orientation enhances absorption of forces from the "in-position" occupant. Although providing a generally planar vertical contact face is desirable when the airbag is fully deployed, airbags may have other orientations during deployment. Some of the other orientations can undesirably strike an occupant as the airbag deploys. Such occupants may include a child standing on the floor of a vehicle in front of a passenger airbag or a child moving toward the front of the vehicle as the passenger airbag deploys.

SUMMARY

An example airbag arrangement includes an airbag moveable between an expansion-constrained position and an expanded position. The airbag includes a contact face. A tether has a first tether end connected adjacent an upper portion of the contact face and a second tether end anchoring the tether. The tether holds the contact face in a substantially vertical position.

The example airbag arrangement may include an expandable airbag having a contact face. A tether has a first end that connects to the contact face and a second end that anchors the tether. The tether constrains expansion of the airbag to move the contact face to a substantially vertical position during initial deployment. The tether has a first tether end connected to the contact face and a second tether end for anchoring the tether. The tether is configured to contact an upper surface of the airbag to constrain expansion of the airbag and move the contact face to a substantially vertical position during an initial deployment.

An example method of constraining an airbag includes anchoring a contact face of an airbag and expanding an upper surface of the airbag against a tether. The method orients the contact face vertically during expansion.

BRIEF DESCRIPTION OF THE DRAWINGS

The various features and advantages of this invention will become apparent to those skilled in the art from the following detailed description of an embodiment of the invention. The drawings that accompany the detailed description can be briefly described as follows.

DETAILED DESCRIPTION OF AN EXAMPLE EMBODIMENT

Figure 1:
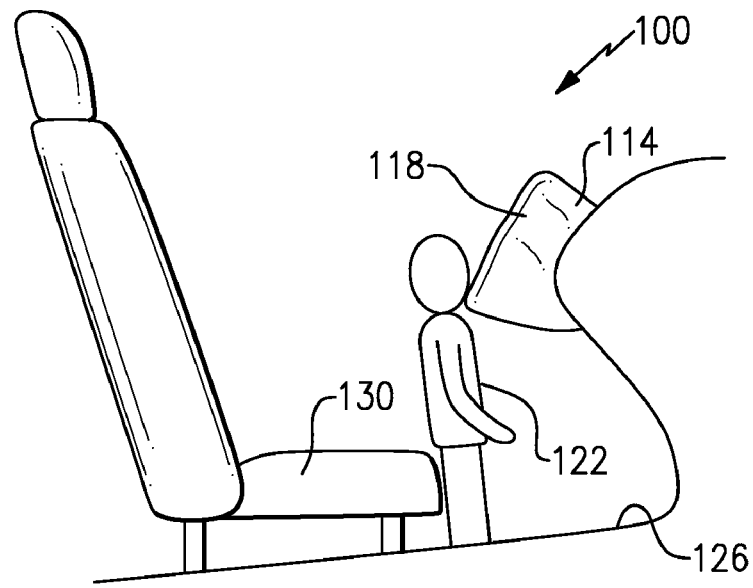
FIG. 1 shows an "out-of-position" occupant and a prior art airbag assembly moving toward an expanded position.
Figure 2:
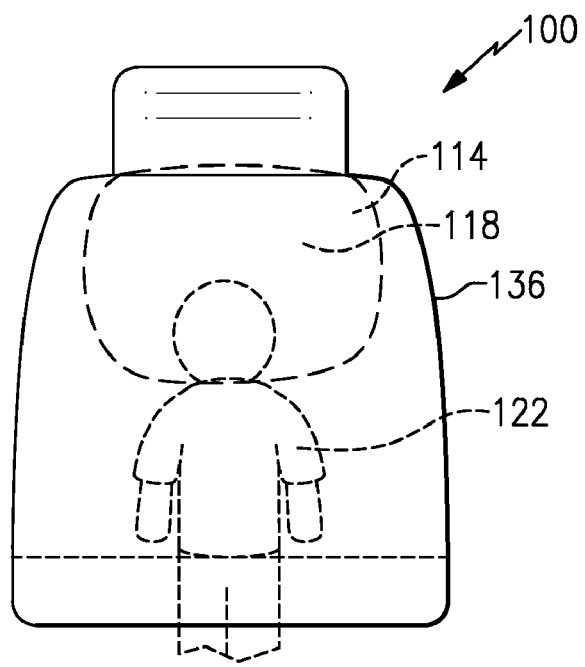
FIG. 2 shows a front view of the FIG. 1 prior art airbag assembly.
Figure 3:
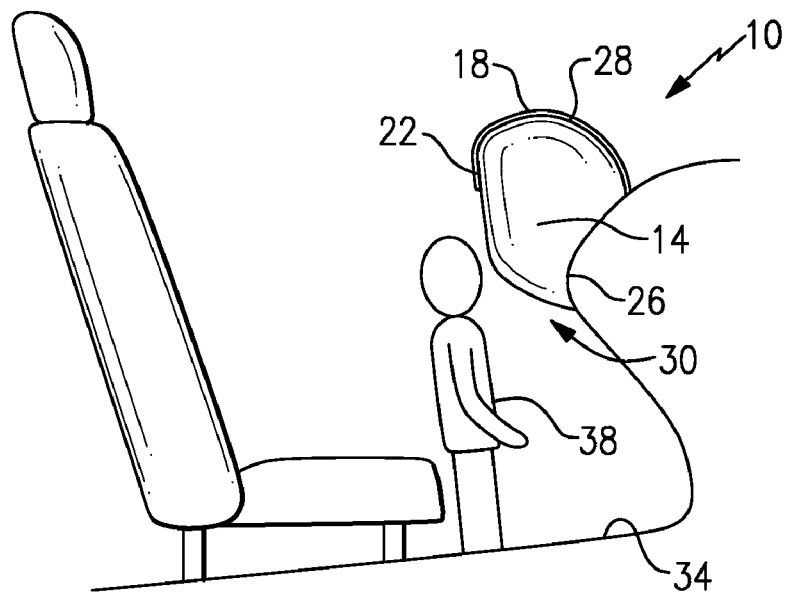
FIG. 3 shows an "out-of-position" occupant and an example airbag assembly in an expansion-constrained position.
Figure 4:
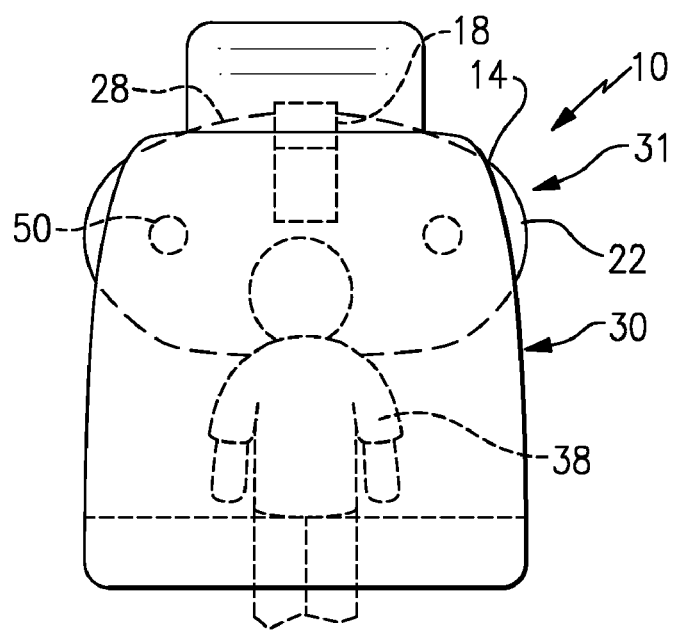
FIG. 4 shows a front view of the FIG. 3 airbag assembly.
Figure 5:
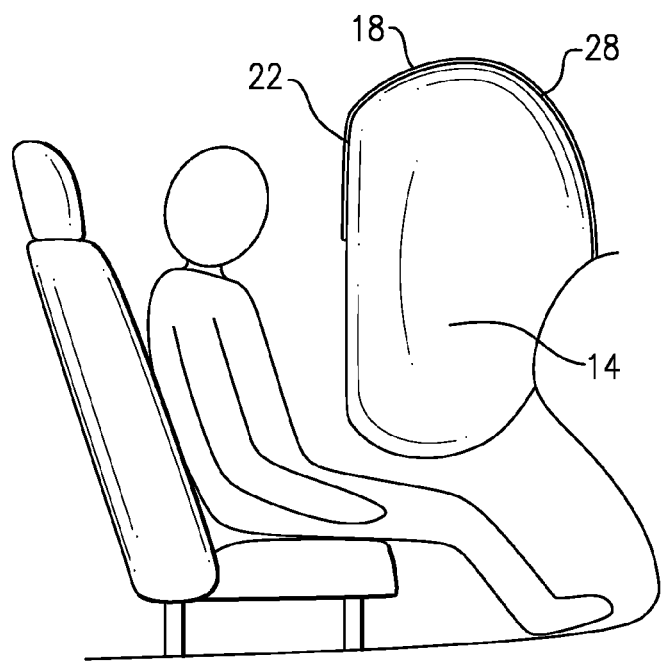
FIG. 5 shows a side view of an "in-position" occupant and the example airbag assembly in an expanded position.

Referring to FIGS. 1 and 2, in a prior art airbag assembly 100, an airbag 114 has a tilted contact area 118 during deployment. The tilted contact area 118 contacts an "out-of-position" occupant, such as a child 122 standing on a vehicle floor 126 in front of a passenger seat 130 during deployment of the airbag 114. As the contact area 118 is generally directed upward during the early stages of deployment, the contact area 18 may contact just the head and neck area of the child 122 and, in some examples, directly strikes the chin of the child.

An example airbag assembly 10 in an expansion-constrained position includes a tether 18 anchoring a portion of an airbag 14 during airbag deployment, as shown in FIGS. 3-6. The tether 18 connects at one end to a contact face area 22 of the airbag 14 and anchors at the other end to the vehicle 26, for example.

The example tether 18 loops over an upper surface 28 of the airbag 14. Tethering the airbag 14 affects the deployment characteristics of airbag 14. In this example, the tether 18 tends to direct a lower portion 30 of the airbag 14 toward a vehicle floor 34. Other relationships between the tether 18 and the airbag 14 are possible.

In this example, the tether 18 causes the contact face 22 of the airbag 14 to maintain a generally vertical profile during the initial deployment stage, and a profile generally flat and perpendicular to the vehicle floor 34. The initial deployment stage generally corresponds to the first 20 milliseconds of deployment. The shape of the airbag 14 is important during this stage. Such a profile tends to strike an "out-of position" occupant, such as a child 38, in the head, neck, chest, and shoulders rather than just the head or chin and neck. Accordingly, forces generated during airbag 14 deployment are distributed across a greater area of the "out-of position" occupant than in the prior art. Distributing the forces in this manner provides a softer deployment for the "out-of-position" occupant.

Figure 7:
FIG. 7 shows a close-up side view of an example tether.
Figure 8:
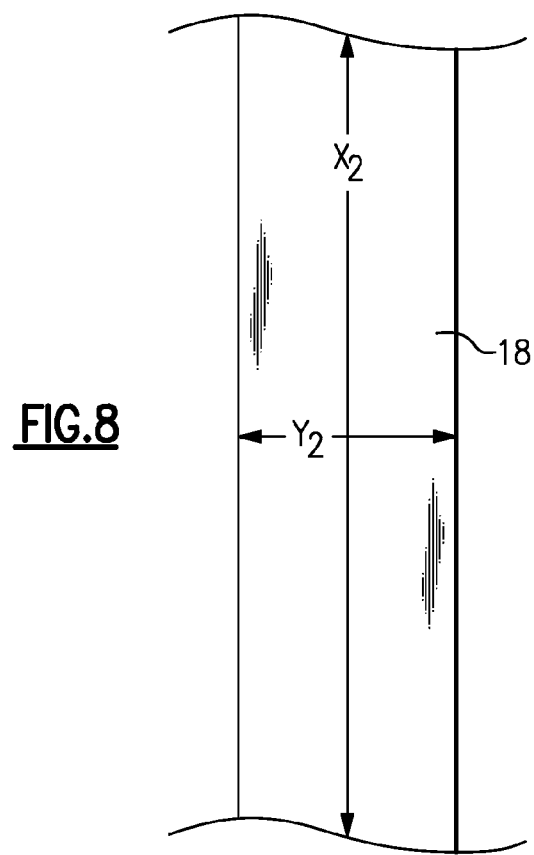
FIG. 8 shows a side view of the FIG. 7 tether in an expanded position.
Figure 9:
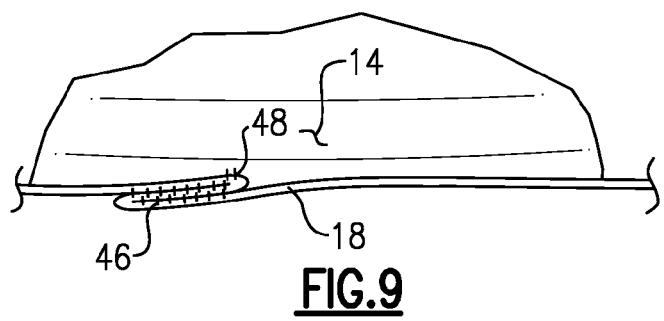
FIG. 9 shows a front view of another example tether.
Figure 10:
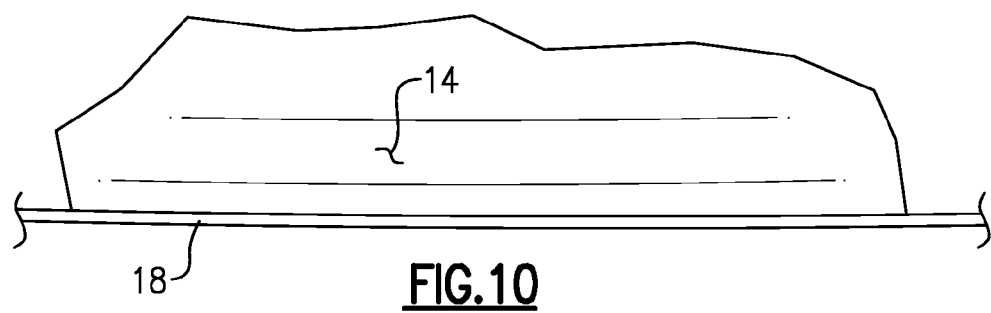
FIG. 10 shows a front view of the FIG. 9 tether in an expanded position.

Referring now to FIGS. 7 and 8, the example tether 18 has a longer intact position, or expanded tether position, when the airbag 14 is in the fully expanded position. The example tether 18 stretches to move from the shorter intact position to the longer intact position as the airbag 14 expands. That is, as the airbag 14 expands, length $X_1$ increases to length $X_2$. Width $Y_1$ decreases to width $Y_2$ as the airbag 14 expands. The longer intact position of the tether 18 permits the airbag 14 to fully expand to a position suitable for protecting an "in-position" occupant 38. In the fully expanded airbag 14, the contact face 22 maintains a generally vertical orientation. The shorter intact position vertically aligns the contact face 22 during deployment by constraining expansion with the shorter intact tether 18. The longer intact position of the tether 18 permits the generally vertical contact face 22 when the airbag 14 is fully expanded Other examples of the tether 18 incorporate features that permit tether 18 movements between the shorter intact position and the longer intact position. For example, referring to FIGS. 9 and 10, the stitches 46 hold the position of folds in the tether 18 during initial deployment of the airbag 14. Exerting force on the tether 18 tears the stitches 46 permitting the tether 18 to unfold an increasing the tether 18 length. Other stitches 48 maintain the position of the tether 18 relative the airbag 14.

Tearing the stitches 46 requires more force than expanding areas of the airbag 14 away from the lower portion 30. But once those areas expand, the expansive forces exerted by the airbag 14 on the tether 18 tear the stitches 46. The tether 18 remains intact even if the stitches 46 tear.

Figure 11:
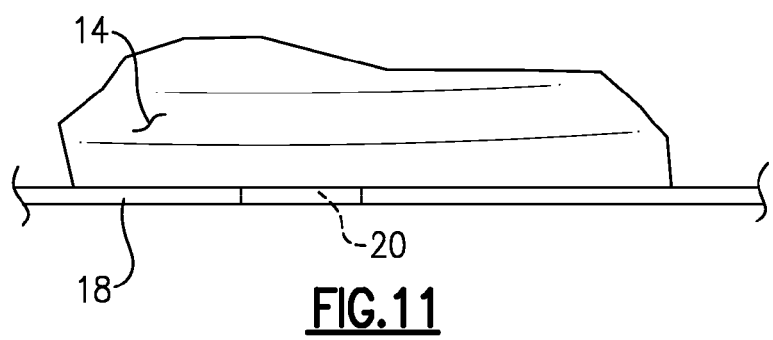
FIG. 11 shows a side view of yet another example tether.
Figure 12:
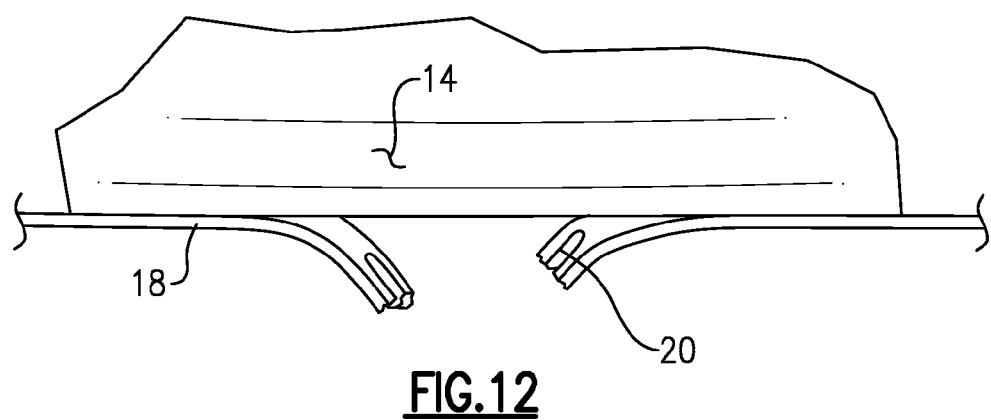
FIG. 12 shows a side view of the FIG. 11 tether in an expanded position.

Those skilled in the art and having the benefit of this disclosure would understand that other features can be used to hold the tether 18 at a shorter length, and then increase the tether 18 length under force. For example, the tether 18 may include a polymer portion that deforms under load and increases the effective length of the tether 18. In still other examples, it may be desirable to break a portion of the tether 18 as the airbag 14 moves from the expansion constrained position to the expanded position, such as the example tether 18 shown in FIGS. 11 and 12. In such examples, the tether 18 includes an aperture 20, which tends to cause the tether 18 to break in an area near the aperture.

Figure 6:
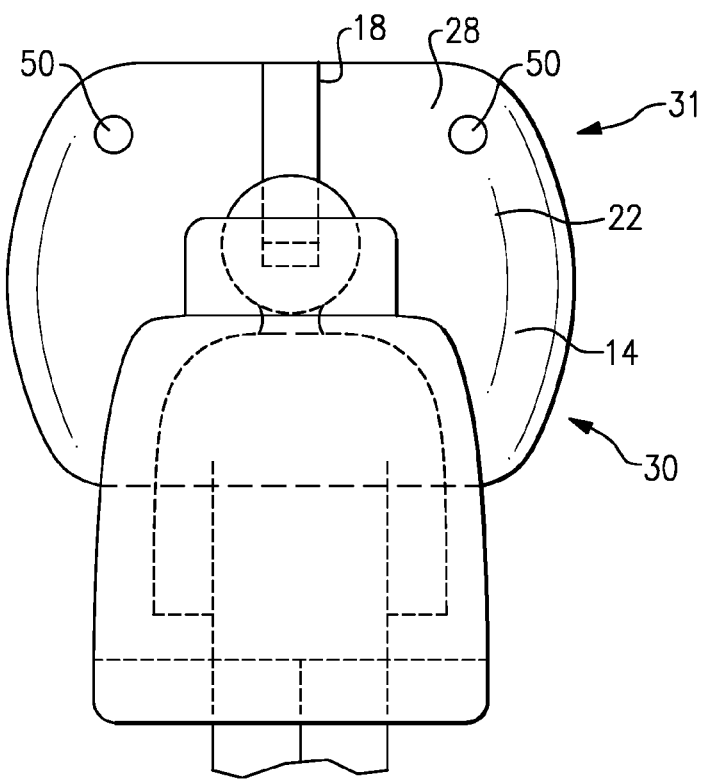
FIG. 6 shows a front view of a FIG. 5 airbag assembly.

In addition to the tether 18, other features may facilitate control of the airbag 14 expansion. For example, an upper portion 31 of the airbag 14 may include vents 50 as shown in FIG. 6. The vents 50 slow the expansion of the upper portion 31 as some of the air moving into the upper portion 31 of the airbag 14 escapes though the vents 50. Slowing the expansion of the upper portion 31 helps vertically orient the airbag 14 during the expansion-constrained portion of airbag 14 deployment.

Changing the size of the vents 50 alters the expansion characteristics of the airbag 14 and the associated expansion speed of the lower portion 30. Thus, the vents 50 can be used to tune the expansion of the airbag 14.

Figure 13:
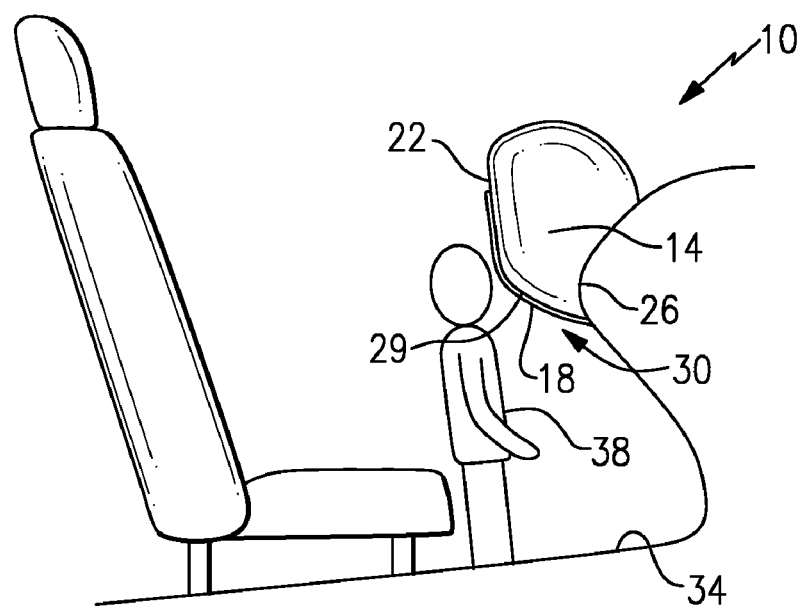
FIG. 13 shows an "out-of-position" occupant and another example airbag assembly in an expansion-constrained position.
Figure 14:
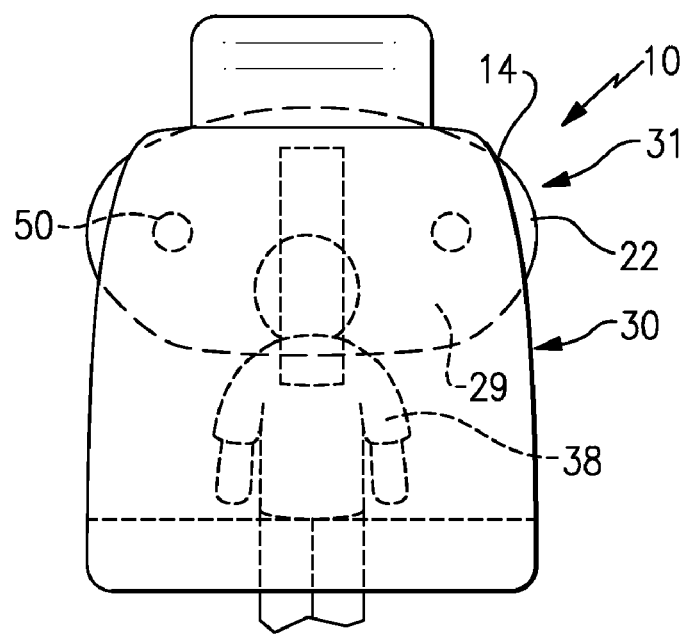
FIG. 14 shows a front view of the FIG. 9 airbag assembly.

Referring now to FIGS. 13 and 14, in another example relationship between the tether 18 and the airbag 14, the tether 18 contacts a lower surface 29 of the airbag 14. A person skilled in the art and having the benefit of this disclosure would be able to adjust the position of the tether 18 relative to the airbag 14 to control the position of the contact face 22 during deployment of the airbag 14.

Referring again to FIG. 6, the location of the vents 50 may further affect the expansion characteristics. In this example, the airbag 14 expands from a 50/50 folded position. Approximately half of the folded area includes the lower portion 30 of the airbag 14, and the other half of the folded area includes the upper portion 31 of the airbag 14. The vents 50 are located within the upper portion 31 so that in the 50/50 folded position, the vents 50 are exposed on the top of the folded airbag 14.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. An airbag arrangement, comprising
   an airbag including an upper portion and a lower portion, said airbag moveable between an expansion-constrained position and an expanded position;
   a contact face of said airbag, said contact face contacting an in-position occupant during a deployment of said airbag or after the deployment; and
   a tether having a first tether end secured to said contact face and a second tether end anchoring said tether, wherein said lower portion is free to expand unencumbered by said tether or any other tether, and said tether is the only tether contacting an outer surface of said airbag.

2. The airbag arrangement of claim 1, wherein a length of said tether increases as said airbag moves from said expansion-constrained position to said expanded position.

3. The airbag arrangement of claim 1, wherein said tether is moveable by said airbag between a shorter intact position and a longer intact position, wherein said tether in said shorter intact position holds said airbag in said expansion-constrained position.

4. The airbag arrangement of claim 1, wherein said second tether end connects adjacent a base of said airbag separate from said airbag.

5. The airbag arrangement of claim 1, including one or more vents in an upper portion of said airbag.

6. The airbag arrangement of claim 1, wherein said first tether end is connected to an upper portion of said contact face that is vertically below a head of an in-position occupant.

7. The airbag arrangement of claim 1, wherein said tether is taut when said airbag is in said expansion-constrained position.

8. The airbag arrangement of claim 1, wherein said tether is centered laterally relative to said airbag.

9. The airbag arrangement of claim 1, wherein said tether contacts the in-position occupant during the deployment or after the deployment.

10. The airbag arrangement of claim 1, wherein said first tether end points downward when said airbag is in the expanded position.

11. An airbag arrangement, comprising
    an airbag;
    a contact face of said airbag, wherein an in-position occupant directly strikes said contact face when said airbag is at least partially expanded; and
    a tether having a first tether end directly connected to said contact face and an opposing, second tether end anchoring said tether, wherein said tether is the exclusive tether contacting an outer surface of said airbag, and said airbag arrangement wherein said tether is intact when said airbag is in an expanded position.

12. The airbag arrangement of claim 11, wherein said first tether end attaches to an upper portion of said airbag at a lateral center of said airbag.

13. The airbag arrangement of claim 11, including one or more vents in an upper portion of said airbag.

14. The airbag arrangement of claim 11, wherein said tether is centered laterally relative to said airbag.

15. The airbag arrangement of claim 11, wherein said tether loops over an upper, outer surface of said airbag at a lateral center of said airbag.

16. The airbag arrangement of claim 11, wherein said second tether end does not connect to said airbag.

17. The airbag arrangement of claim 11, wherein the in-position occupant directly strikes said first tether end when said airbag is at least partially expanded.

18. A method of constraining an airbag comprising:
   (a) anchoring a contact face of an airbag using a single tether that is laterally aligned with an in-position occupant and directly connected to the contact face of the airbag, the contact face contacting an in-position occupant when the airbag is at least partially expanded;
   (b) expanding a surface of the airbag against the tether; and
   (c) moving the tether from a shorter intact position to a longer intact position using the airbag as the airbag expands.

19. The method of claim 18, further including directing the airbag downward during initial deployment.

20. The method of claim 18, including contacting the in-position occupant with a portion of the tether.

* * * * *